(12) United States Patent
Strahin (10) Patent No.: US 11,773,494 B2
(45) Date of Patent: Oct. 3, 2023

(54) MODIFIED OXIDE SURFACE TREATMENT LAYER FOR ALLOYS AND CORRESPONDING METHODS

(71) Applicant: Brandon Strahin, Diamond, OH (US)

(72) Inventor: Brandon Strahin, Diamond, OH (US)

(73) Assignee: The University of Akron, Akron, OH (US)

( * ) Notice: Subject to any disclaimer, the term of this patent is extended or adjusted under 35 U.S.C. 154(b) by 1050 days.

(21) Appl. No.: 16/569,994

(22) Filed: Sep. 13, 2019

(65) Prior Publication Data

US 2020/0087797 A1 Mar. 19, 2020

Related U.S. Application Data

(60) Provisional application No. 62/822,111, filed on Mar. 22, 2019, provisional application No. 62/822,094, (Continued)

(51) Int. Cl.
*C23C 30/00* (2006.01)
*C22C 14/00* (2006.01)
*B32B 15/04* (2006.01)
*C23C 8/24* (2006.01)
*C23C 8/10* (2006.01)
(Continued)

(52) U.S. Cl.
CPC ............ *C23C 30/005* (2013.01); *B32B 15/04* (2013.01); *C22C 14/00* (2013.01); *C23C 8/10* (2013.01); *C23C 8/24* (2013.01); *C01B 21/06* (2013.01); *C23C 8/12* (2013.01); *C23C 8/34* (2013.01); *Y10T 428/252* (2015.01); *Y10T 428/265* (2015.01)

(58) Field of Classification Search
None
See application file for complete search history.

(56) References Cited

U.S. PATENT DOCUMENTS 6,093,259 A     7/2000 Watanabe et al.
2015/0351913 A1* 12/2015 Sun .................... A61F 2/3094
                                                   219/76.12

FOREIGN PATENT DOCUMENTS

CN          1715439 A  *  1/2006
WO    WO-2009104168 A2  *  8/2009   ........... A61L 24/001

OTHER PUBLICATIONS

Wang et al. "Microstructure and Wear Resistance of N-Doped TiO2 Coatings Grown on Stainless Steel by Plasma Surface Alloying Technology"; Wang He-feng, Tang Bin, Li Xiu-yan; Journal of Iron and Steel Research. International. 2011, 18(7): 73-78 (Year: 2011).*

(Continued)

*Primary Examiner* — Humera N. Sheikh
*Assistant Examiner* — Elizabeth D Ivey
(74) *Attorney, Agent, or Firm* — Renner, Kenner, Greive, Bobak, Taylor & Weber (57) ABSTRACT

A surface treatment layer for a titanium-containing substrate includes a disordered metal oxide lattice having metal nitride compounds doped in the disordered metal oxide lattice. A method of surface treating a metal substrate includes introducing oxygen to a titanium-containing substrate to thereby form an oxide layer within the titanium-containing substrate, and, after the step of introducing oxygen, introducing nitrogen to the titanium-containing substrate to thereby modify the oxide layer to form a surface treatment layer.

13 Claims, 4 Drawing Sheets

Related U.S. Application Data filed on Mar. 22, 2019, provisional application No. 62/730,776, filed on Sep. 13, 2018.

(51) Int. Cl.
  *C01B 21/06* (2006.01)
  *C23C 8/12* (2006.01)
  *C23C 8/34* (2006.01)

(56) References Cited

OTHER PUBLICATIONS

Bakar et al. "Nitrogen-doped titanium dioxide: An overview of material design and dimensionality effect over modern applications"; Shahzad Abu Bakar, Caue Ribeiro; A Journal of Photochemistry and Photobiology C: Photochemistry Reviews 27 (2016) 1-29; May 19, 2016 (Year: 2016).*
Translation—CN 1715439 A; Xiong D; Jan. 2006 (Year: 2006).*
Dong et al.; Defective Black TiO2 Synthesized via Anodization for Visible-Light Photocatalysis; Appl. Mater. Interfaces 2014, 6, 1385-1388; published Feb. 4, 2014.
Li et al.; Electrochemical doping of anatase TiO2 in organic electrolytes for high-performance supercapacitors and photocatalysts; J. Mater. Chem. A, 2014, 2, 229-236.
Chen et al.; Black titanium dioxide (TiO2) nanomaterials; Chem. Soc. Rev., 2015, 44, 1861-1885.

* cited by examiner

MODIFIED OXIDE SURFACE TREATMENT LAYER FOR ALLOYS AND CORRESPONDING METHODS

CROSS REFERENCE TO RELATED APPLICATIONS

The present application claims the benefit of U.S. Provisional Patent Application No. 62/730,776 filed on Sep. 13, 2018; U.S. Provisional Patent Application No. 62/822,094 filed on Mar. 22, 2019; and U.S. Provisional Patent Application No. 62/822,111 filed on Mar. 22, 2019; and the contents of each are incorporated herein by reference.

FIELD OF THE INVENTION

The present invention generally relates to a surface treatment for alloys and associated methods of preparing the surface treatment. The present invention further relates to a surface treatment including an oxide layer modified by a post-nitriding process applied to the oxide layer.

BACKGROUND OF THE INVENTION

Attempts have been made to reduce the weight and increase efficiency of mechanical components. For example, certain steel components have been replaced with those made from titanium alloys. However, it is well known that titanium alloys have poor wear resistance and are susceptible to rapid oxidation wear due to the lack of structural support of the oxide layer. This oxidative wear progresses as re-oxidation occurs and adds additional wear debris to the wear location with each occurrence. Therefore, coatings or surface treatments are often applied to components made from titanium alloys to improve their wear resistance and to reduce their friction coefficients.

These surface treatments aim to achieve certain surface properties for the titanium alloys. Many surface treatments are duplex surface treatments, which include a first treatment followed by a second treatment. Duplex surface treatments generally fall into two categories: complementary duplex treatments (CDT) and supplementary duplex treatments (SDT). In complementary duplex treatments, one treatment process complements the subsequent treatment process and the combined effects of the final surface treatment layer generally result from both processes. In supplementary duplex treatments, the subsequent treatment process modifies the surface treatment created by the initial treatment process and the effects of the final surface treatment layer generally result from only one of the treatment processes.

One major drawback to certain methods currently being used to prepare duplex surface treatments is that they require electrodeposition using hazardous chemicals. Others require the use of physical vapor deposition (PVD) or chemical vapor deposition (CVD) techniques, with one of the surface treatments occurring during the deposition.

There remains a need in the art for improved surface treatments for alloys.

SUMMARY OF THE INVENTION

In a first embodiment, the present invention provides a surface treatment layer for a titanium-containing substrate comprising a disordered metal oxide lattice having metal nitride compounds doped in the disordered metal oxide lattice.

In a second embodiment, the present invention provides a surface treatment layer as in any of the above embodiments, wherein the surface treatment layer includes from about 1 wt. % to about 40 wt. % of the metal nitride compounds.

In a third embodiment, the present invention provides a surface treatment layer as in any of the above embodiments, wherein the surface treatment layer includes from about 6 wt. % to about 25 wt. % of the metal nitride compounds.

In a fourth embodiment, the present invention provides a surface treatment layer as in any of the above embodiments, wherein the surface treatment layer has a thickness of from about 1 µm to about 15 µm and a hardness of from about 1600 HV to about 2300 HV.

In a fifth embodiment, the present invention provides a surface treatment layer as in any of the above embodiments, wherein the surface treatment layer has a thickness of from about 2 µm to about 10 µm and a hardness of from about 1800 HV to about 2200 HV.

In a sixth embodiment, the present invention provides a surface treatment layer as in any of the above embodiments, the disordered metal oxide lattice having a mean average grain size that is less than 100 nm.

In a seventh embodiment, the present invention provides a coated metal component comprising a titanium-containing substrate having a surface treatment layer therein, the surface treatment layer including a disordered metal oxide lattice having metal nitride compounds doped in the disordered metal oxide lattice.

In an eighth embodiment, the present invention provides a coated metal component as in any of the above embodiments, wherein the titanium-containing substrate includes at least 40 wt. % titanium.

In a ninth embodiment, the present invention provides a coated metal component as in any of the above embodiments, wherein the titanium-containing substrate includes at least 70 wt. % titanium.

In a tenth embodiment, the present invention provides a coated metal component as in any of the above embodiments, wherein the surface treatment layer includes from about 1 wt. % to about 40 wt. % of the metal nitride compounds.

In an eleventh embodiment, the present invention provides a coated metal component as in any of the above embodiments, wherein the surface treatment layer includes from about 6 wt. % to about 25 wt. % of the metal nitride compounds.

In a twelfth embodiment, the present invention provides a coated metal component as in any of the above embodiments, wherein the surface treatment layer has a thickness of from about 1 µm to about 15 µm and a hardness of from about 1600 HV to about 2300 HV.

In a thirteenth embodiment, the present invention provides a coated metal component as in any of the above embodiments, wherein the surface treatment layer has a thickness of from about 2 µm to about 10 µm and a hardness of from about 1800 HV to about 2200 HV.

In a fourteenth embodiment, the present invention provides a coated metal component as in any of the above embodiments, the disordered metal oxide lattice having a mean average grain size that is less than 100 nm.

In a fifteenth embodiment, the present invention provides a coated metal component as in any of the above embodiments, wherein the titanium-containing substrate is selected from the group consisting of a slide in a bolt carrier, a knee replacement part, a hip replacement part, a gear, a crankshaft, a knife, and shears.

In a sixteenth embodiment, the present invention provides a method including steps of providing a titanium-containing substrate being substantially devoid of an oxide layer, introducing oxygen to the titanium-containing substrate to thereby form an oxide layer within the titanium-containing substrate, and after the step of introducing oxygen, introducing nitrogen to the titanium-containing substrate to thereby modify the oxide layer to form a surface treatment layer.

In a seventeenth embodiment, the present invention provides a method as in any of the above embodiments, wherein the step of introducing oxygen is a thermal oxidation step.

In an eighteenth embodiment, the present invention provides a method as in any of the above embodiments, wherein the step of introducing nitrogen is a gas nitriding step.

BRIEF DESCRIPTION OF THE DRAWINGS

Advantages of the present invention will become better understood with regard to the following description, appended claims, and accompanying drawings wherein:

DETAILED DESCRIPTION OF ILLUSTRATIVE EMBODIMENTS

Embodiments of the present invention are based, at least in part, on corrosion and wear resistant coatings for alloy substrates and methods for preparing the coatings. Methods for preparing the corrosion and wear resistant coatings include a first step of oxidizing a layer of the alloy substrate, which may be a step of thermal oxidation. The step of oxidizing forms an oxidized layer within the alloy substrate. The oxidized layer includes metal oxide compounds formed from the primary metal of the alloy substrate and the oxygen from the oxidation step. Following the oxidizing step, the oxidized-layer-containing alloy substrate is subjected to a nitriding step. The nitriding step imparts nitrogen to the oxidized layer of the alloy substrate. It is believed that the nitrogen of the nitriding step serves two functions. First, the nitrogen replaces the oxygen in at least some of the metal oxide compounds to form metal nitride compounds. Also, the nitrogen is believed to cause some disordering of the metal oxide lattice of the remaining metal oxide compounds. Thus, the coating layer (i.e. the surface treatment) of the alloy substrate that results after the nitriding step is a metal-nitride-doped metal oxide layer, where the metal oxide is of a disordered structure. Advantageously, the coating layer provides both sufficient corrosion resistance and wear resistance for the alloy substrate.

Figure 1:
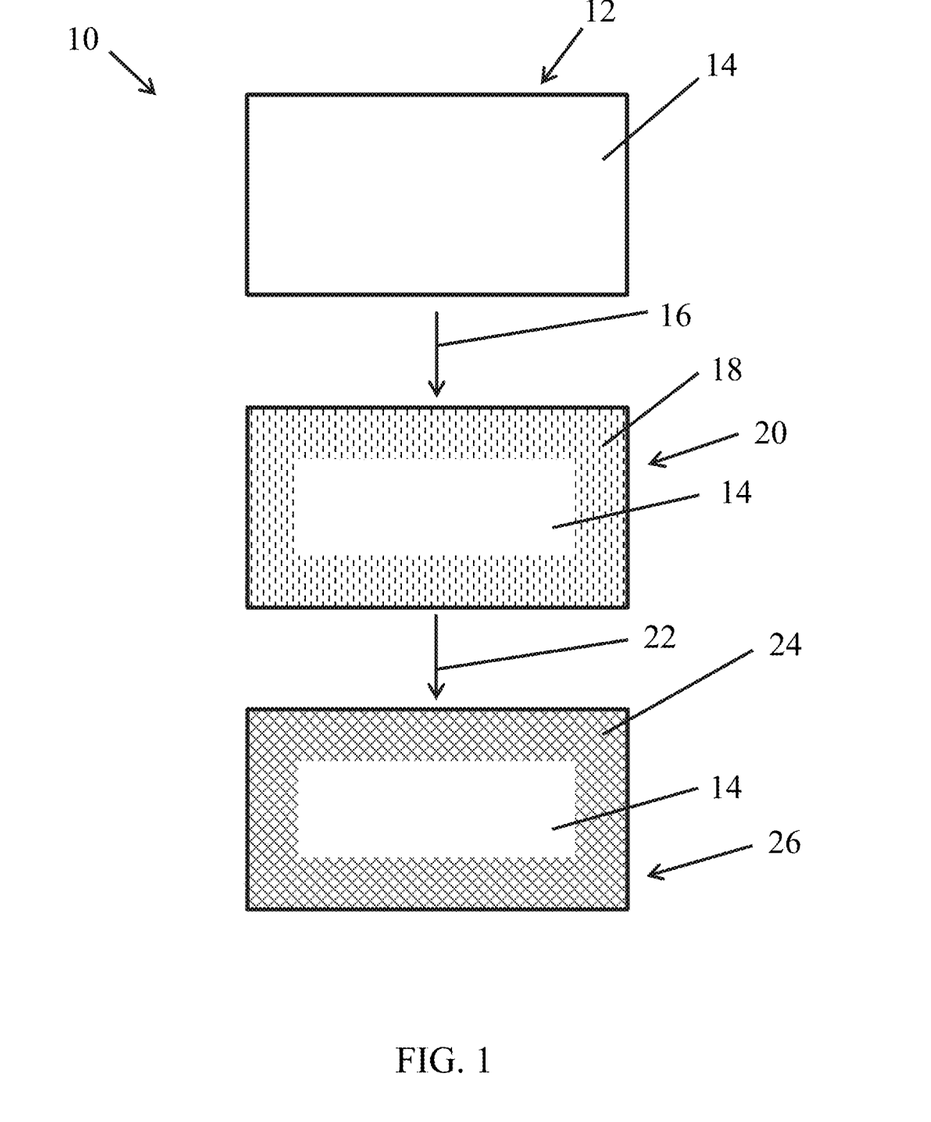
FIG. 1 is a schematic of a method according to one or more embodiments of the invention.

With reference to FIG. 1, a method 10 for providing a corrosion resistant and wear resistant coating on an alloy substrate includes a first step 12 of providing an alloy substrate 14. Step 12 may include the alloy substrate 14 being devoid or substantially devoid of metal oxide compounds and a metal oxide layer.

An oxidation step 16 includes providing oxygen to alloy substrate 14 at suitable conditions to form an oxidized layer 18 within the overall alloy substrate 14, which is shown in a cross-sectional schematic view in FIG. 1. Oxidized layer 18 includes metal oxide compounds formed from the primary metal of alloy substrate 14 and the oxygen from oxidation step 16. In one or more embodiments, oxidization layer 18, which may be referred to as oxidized layer 18 or oxide layer 18, may be formed by providing clean, dry air to alloy substrate 14. Since the oxygen of step 16 combines with metal of the alloy substrate 14, oxidation layer 18 might be described as existing within the overall alloy substrate 14, which may be described as an oxidation-layer-containing alloy substrate 20. It might also be considered that oxidation-layer-containing alloy substrate 20 includes oxidation layer 18 as a separate layer positioned on the original alloy of alloy substrate 14.

A nitriding step 22 includes providing nitrogen to oxidation-layer-containing alloy substrate 20 at suitable conditions to form a coating layer 24 within the overall alloy substrate 14, which is shown in a cross-sectional schematic view in FIG. 1. Coating layer 24, which may also be referred to as surface treatment layer 24 or nitrided layer 24, particularly includes imparting nitrogen to oxidized layer 18. As suggested above, it is believed that the nitrogen of step 22 replaces the oxygen in at least some of the metal oxide compounds of oxidized layer 18 to form metal nitride compounds in coating layer 24. Also, the nitrogen of step 22 is believed to cause some disordering of the metal oxide lattice of the remaining metal oxide compounds of coating layer 24. Thus, coating layer 24 may be described as a disordered metal oxide lattice including metal nitride compounds doped in the disordered lattice. Similar to the above description for oxidation layer 18, coating layer 24 might be described as existing within the overall alloy substrate 14, which may be described as a coated alloy substrate 26 or a surface treated alloy substrate 26. It might also be considered that coated alloy substrate 26 includes coating layer 24 as a separate layer positioned on the original alloy of alloy substrate 14. Coating layer 24 provides corrosion resistance and wear resistance for coated alloy substrate 26. Coating layer 24 may include a black, non-reflective surface.

As discussed above, a first step 12 includes providing alloy substrate 14.

In one or more embodiments, alloy substrate 14 may include titanium as the primary metal component. In these embodiments, alloy substrate 14 can therefore also be referred to as titanium-containing substrate 14, titanium alloy substrate 14, titanium-containing alloy 14, or titanium alloy 14. Alloy substrate 14 may be a mixture of the titanium and one or more suitable secondary elements. Exemplary secondary elements include chromium (Cr), nickel (Ni), iron (Fe), silicon (Si), manganese (Mn), molybdenum (Mo), niobium (Nb), tantalum (Ta), cobalt (Co), copper (Cu), aluminum (Al), carbon (C), sulfur (S), phosphorous (P), boron (B), tungsten (W), vanadium (V), and zirconium (Zr).

In one or more embodiments, alloy substrate 14 may include from about 10 wt. % to about 100 wt. % titanium, in other embodiments, from about 50 wt. % to about 95 wt. % titanium, in other embodiments, from about 80 wt. % to about 95 wt. % titanium, in other embodiments, from about 85 wt. % to about 92 wt. % titanium, and in other embodiments, from about 88 wt. % to about 92 wt. % titanium. In one or more embodiments, alloy substrate 14 may include at least 40 wt. % titanium, in other embodiments, at least 45 wt. % titanium, in other embodiments, at least 50 wt. % titanium, in other embodiments, at least 60 wt. % titanium, in other embodiments, at least 70 wt. % titanium, in other embodiments, at least 80 wt. % titanium, in other embodiments, at least 85 wt. % titanium, and in other embodiments, at least 90 wt. % titanium.

In one or more embodiments, alloy substrate 14 may be Ti-6Al-4V. In these or other embodiments, alloy substrate 14 may include from about 5.5 wt. % to about 6.75 wt. % aluminum, in other embodiments, from about 5.75 wt. % to about 6.5 wt. % aluminum, and in other embodiments, from about 6 wt. % to about 6.25 wt. % aluminum. In these or other embodiments, alloy substrate 14 may include from about 3.2 wt. % to about 3.5 wt. % vanadium, in other embodiments, from about 3.5 wt. % to about 4.5 wt. % vanadium, and in other embodiments, from about 3.8 wt. % to about 4.2 wt. % vanadium.

In one or more embodiments, alloy substrate 14 may include nickel as the primary metal component with titanium as the secondary component. These alloys may be generally known by the name nitinol. In one or more embodiments, alloy substrate 14 may include from about 54 wt. % to about 57 wt. % nickel and from about 43 wt. % to about 46 wt. % titanium. In one or more embodiments, alloy substrate 14 may include from about 55 wt. % to about 56 wt. % nickel and from about 44 wt. % to about 45 wt. % titanium.

Exemplary alloy substrates 14 include machine components, gun components, medical devices, tools, aircraft components, alternative energy components, aerospace components, and automotive components. In one or more embodiments, alloy substrate 14 can be selected from the group consisting of a slide in a bolt carrier, a knee replacement part, a hip replacement part, gears, crankshafts, knives, and shears.

As suggested above, oxidation step 16 includes providing oxygen to alloy substrate 14 at suitable conditions to form an oxidized layer 18, which may also be described as an oxidized titanium surface layer 18. Oxidation step 16 may be accomplished by a variety of suitable techniques. Exemplary techniques for oxidation step 16 include pulsed plasma oxidation, plasma electrolytic oxidation, anodizing, oxidizing salt, and thermal oxidation. Oxidation step 16 may include a mix of diffusion and dissolution of oxygen in alloy substrate 14.

In one or more embodiments, oxidation step 16 occurs for about one hour to about twelve hours, in other embodiments, for about six hours to about twelve hours, and in other embodiments, for about eight hours to about ten hours.

In one or more embodiments, oxidation step 16 may include sub-steps of placing alloy substrate 14 in a high temperature furnace, ramping the temperature of the furnace to a treating temperature, providing oxygen gas to alloy substrate 14, holding the temperature of the furnace at a treating temperature, and cooling oxidation-layer-containing alloy substrate 20, which may be with or without a quench.

In one or more embodiments, the oxygen gas may be provided to alloy substrate 14 as a partial pressure with other gases. In other embodiments, the oxygen gas may be provided to alloy substrate 14 as only oxygen gas.

In one or more embodiments, the treating temperature of oxidizing step 16 may be about 650° C., in other embodiments, about 700° C., and in other embodiments, about 750° C. In one or more embodiments, the treating temperature of oxidizing step 16 may be in a range of from about 400° C. to about 850° C., in other embodiments, from about 600° C. to about 800° C., and in other embodiments, from about 650° C. to about 750° C.

In one or more embodiments, the furnace may be held at the treating temperature during oxidizing step 16 for about two hours, in other embodiments, for about six hours, in other embodiments, for about eight hours, and in other embodiments, for about twelve hours. In one or more embodiments, the furnace may be held at the treating temperature during oxidizing step 16 for at least six hours, in other embodiments, for at least eight hours, and in other embodiments, for at least ten hours. In one or more embodiments, the furnace may be held at the treating temperature during oxidizing step 16 for about one hour to about twelve hours, in other embodiments, for about six hours to about ten hours, and in other embodiments, for about seven hours to about nine hours.

The treating temperature and the time at the treating temperature for oxidizing step 16 may be designed in order to avoid poor adhesion and brittleness of oxidation layer 18.

As suggested above, oxidation layer 18 forms as part of alloy substrate 14 based on a reaction between the metal in alloy substrate 14 and an oxygen source supplied to alloy substrate 14. Thus, a layer of alloy substrate 14 near the surface is converted to oxidation layer 18 made of oxidized metal (e.g. oxidized titanium). Since alloy substrate 14 may include the primary metal and one or more secondary metals, a variety of metal oxide compounds may form in oxidation layer 18. For example, oxide layer may include a mixture of titanium and aluminum oxides.

Oxidation layer 18 should have sufficient adhesion with alloy substrate 14. Oxidation layer 18 may be of anatase and/or rutile structure.

In one or more embodiments, oxidation layer 18 has a thickness of from about 1 to about 100 µm, in other embodiments, from about 4 to about 10 µm, in other embodiments, from about 1 to about 30 µm, in other embodiments, from about 25 to about 80 µm, and in other embodiments, from about 75 to about 100 am. In one or more embodiments, oxidation layer 18 has a thickness of about 8 am. The thickness of oxidation layer 18 can be adjusted based on the time and temperature of oxidation step 16.

By oxidizing oxidation layer 18, oxidation layer 18 will have a higher hardness than the remainder of alloy substrate 14. In one or more embodiments, oxidation layer 18 has a hardness of from about 300 HV to about 1200 HV, in other embodiments, from about 500 HV to about 1000 HV, and in other embodiments, from about 600 HV to about 900 HV. In one or more embodiments, oxidation layer 18 has a hardness of at least 500 HV, and in other embodiments, oxidation layer 18 has a hardness of at least 700 HV.

Oxidation layer 18 has a mean average grain size that may be subsequently reduced in nitriding step 22, as will be further discussed herein. In one or more embodiments, oxidation layer 18 has a mean average grain size of from about 100 nm to about 300 nm, in other embodiments, from about 150 nm to about 250 nm, and in other embodiments, from about 180 nm to about 220 nm. In one or more embodiments, oxidation layer 18 has a mean average grain size of about 150 nm, in other embodiments, about 200 nm, and in other embodiments, about 250 nm. In one or more embodiments, oxidation layer 18 has a mean average grain size of at least 150 nm, and in other embodiments, at least 200 nm.

Though FIG. 1 shows oxidation layer 18 generally as a single layer, it should be readily appreciated that oxidation layer 18 may include two or more regions of differing composition, which may also be referred to as sub-layers. For example, the oxygen provided during oxidizing step 16 will begin to diffuse into alloy substrate 14. The oxygen diffuses to a certain location within the interior of alloy substrate 14. As further oxygen diffuses nearer to the surface of alloy substrate 14, the oxygen reaches a certain concentration such that it will be able to form metal oxides with the metals of alloy substrate 14. Though, not all of the diffused oxygen may form metal oxides and a gradient portion of an oxygen saturated area may exist where the oxygen has not formed metal oxides. This gradient portion may include a α-lattice of the metal. The thicknesses of the metal oxide portion and the gradient portion may be affected by the time and temperature of oxidizing step 16 and the alloy content of alloy substrate 14.

Prior to forming oxidation layer 18, alloy substrate 14 may have a contamination layer that will need to be removed. The contamination layer may have a thickness of a few atoms and may include absorbed carbon and oxygen, and potentially other impurities. These contamination layers generally exist on all untreated surfaces. Suitable techniques to remove the contamination layer may be utilized.

As suggested above, nitriding step 22 includes providing nitrogen to oxidation-layer-containing alloy substrate 20 at suitable conditions to form coating layer 24, which may also be described as nitrided surface layer 24. Nitriding step 22 may be accomplished by a variety of suitable techniques. Exemplary techniques for nitriding step 22 include gas nitriding, pulsed plasma nitriding, salt bath nitriding, laser nitriding, and ion nitriding.

In one or more embodiments, nitriding step 22 occurs for about one hour to about twelve hours, in other embodiments, for about six hours to about twelve hours, and in other embodiments, for about eight hours to about ten hours.

In one or more embodiments, nitriding step 22 may include sub-steps of placing oxidation-layer-containing alloy substrate 20 in a high temperature furnace, adjusting the pressure of the furnace, ramping the temperature of the furnace to a treating temperature, providing nitrogen gas to oxidation-layer-containing alloy substrate 20, holding the temperature of the furnace at a treating temperature, and cooling oxidation-layer-containing alloy substrate 20, which may include quenching oxidation-layer-containing alloy substrate 20 with a nitrogen gas backfill.

In one or more embodiments, the nitrogen gas may be provided to oxidation-layer-containing alloy substrate 20 as a partial pressure with other gases. In other embodiments, the nitrogen gas may be provided to oxidation-layer-containing alloy substrate 20 as only nitrogen gas.

In one or more embodiments, the treating temperature during nitriding step 22 may be about 400° C., in other embodiments, about 500° C., in other embodiments, about 600° C., and in other embodiments, about 750° C. In one or more embodiments, the treating temperature during nitriding step 22 may be in a range of from about 400° C. to about 900° C., in other embodiments, from about 500° C. to about 750° C., and in other embodiments, from about 500° C. to about 600° C.

In one or more embodiments, the furnace may be held at the treating temperature during nitriding step 22 for about one hour, in other embodiments, for about six hours, in other embodiments, for about eight hours, and in other embodiments, for about ten hours. In one or more embodiments, the furnace may be held at the treating temperature during nitriding step 22 for at least six hours, in other embodiments, for at least eight hours, and in other embodiments, for at least ten hours. In one or more embodiments, the furnace may be held at the treating temperature during nitriding step 22 for about one hour to about ten hours, in other embodiments, for about six hours to about ten hours, and in other embodiments, for about eight hours to about ten hours.

The treating temperatures and the time at the treating temperature for nitriding step 22 may be designed in order to achieve the desired properties of coating layer 24 disclosed elsewhere herein. Other adjustable aspects of nitriding step 22 may include gas composition, gas flow rate, gas pressure, heating rate, cooling rate, current, and voltage.

One or more additional aspects of nitriding step 22 and associated aspects of imparting nitrogen to form coating layer 24 may be disclosed in U.S. Pat. Nos. 2,804,410; 3,677,832; 5,320,686; 5,443,663; 5,961,792; and 8,203,095, which are all incorporated herein by reference.

As suggested above, nitriding step 22 forms coating layer 24 within coated alloy substrate 26. The nitrogen provided in nitriding step 22 diffuses into, interacts with, and modifies oxidation layer 18. As mentioned above, though FIG. 1 shows oxidation layer 18 generally as a single layer, it should readily be appreciated that oxidation layer 18 may include a metal oxide portion and an oxygen-saturated portion. The initial nitrogen provided in nitriding step 22 diffuses relatively quickly through the metal oxide portion and into the oxygen-saturated portion. This may create a buildup of nitrogen in the oxygen-saturated portion, particularly near the interface with the non-saturated portion of alloy substrate 14, with a decreasing gradient towards the surface of alloy substrate 14.

As further nitrogen diffuses into oxidation layer 18, the concentration of the nitrogen builds in the metal oxide portion until the nitrogen reaches a certain concentration. Upon reaching this concentration, the nitrogen will cause some of the metal oxides to convert to metal nitrides. The nitrogen also causes the metal oxide lattice to become disordered. As used herein, the term disordered is defined as the order of the molecules in the metal oxide lattice being altered from the natural state. This may also be defined as the metal oxide lattice being at least partially disordered. It is believed that the metal oxide lattice may be modified through a combination of lattice expansion, vacancies, and oxygen-nitrogen substitutions.

Though FIG. 1 shows coating layer 24 generally as a single layer, it should be readily appreciated that coating layer 24 may include two or more regions of differing composition, which may also be referred to as sub-layers. As suggested above, the nitrogen provided in nitriding step 22 both diffuses into the oxygen-saturated portion and interacts with and modifies the metal oxide portion. Some of the nitrogen may remain in the oxygen-saturated portion as saturated nitrogen and thereby form a gradient portion having nitrogen saturation and oxygen saturation separate from the modified metal oxide portion. The modified metal oxide portion may also include an interlayer having a gradient composition based on the diffusion rate. The thicknesses of the modified metal oxide portion and the gradient portion may be affected by the time and temperature of nitriding step 22 and the composition of oxidation-layer-containing alloy substrate 20.

As suggested above, the modified metal oxide portion, which may also be referred to as a compound portion, includes metal nitrides and a disordered metal oxide lattice. This may also be referred to as the metal nitride being doped in the disordered metal oxide lattice. The grain size in the modified metal oxide portion may be less than 100 nm, such that the modified metal oxide portion may also be referred to as a nanocrystalline modified metal oxide portion. The modified metal oxide portion may also be characterized as a rutile metal oxide layer including metal nitride crystals in the rutile metal oxide layer. The modified metal oxide portion may undergo a phase change.

The disordering or modification of the modified metal oxide portion may be analyzed by taking a transmission electron microscopy (TEM) diffraction pattern (DP) image of coating layer 24. Optical analysis of the TEM DP image can determine the amount of disordering, as generally known to the skilled person. It is believed that the modified metal oxide portion may not be fully disordered or amorphous.

As suggested above, coating layer 24 provides sufficient corrosion resistance and wear resistance. Coating layer 24 may be a black, non-reflective surface. Coating layer 24 may be devoid or substantially devoid of anatase structure.

In one or more embodiments, coating layer 24 has a thickness of from about 10 to about 100 μm, in other embodiments, from about 15 to about 50 μm, in other embodiments, from about 15 to about 30 μm, and in other embodiments, from about 20 to about 30 am. In one or more embodiments, coating layer 24 has a thickness of about 25 am.

In one or more embodiments, a modified metal oxide portion of coating layer 24 has a thickness of from about 1 to about 15 μm, in other embodiments, from about 1 to about 10 μm, in other embodiments, from about 2 to about 15 μm, in other embodiments, from about 2 to about 10 μm, in other embodiments, from about 5 to about 15 am. In one or more embodiments, a modified metal oxide portion of coating layer 24 has a thickness of about 7 am.

In one or more embodiments, a modified metal oxide portion of coating layer 24 has a hardness of from about 1200 HV to about 2400 HV, in other embodiments, from about 1600 HV to about 2300 HV, in other embodiments, from about 1800 HV to about 2200 HV, and in other embodiments, from about 1900 HV to about 2100 HV. In one or more embodiments, a modified metal oxide portion of coating layer 24 has a hardness of about 1900 HV, in other embodiments, about 2000 HV, and in other embodiments, about 2100 HV.

In one or more embodiments, a modified metal oxide portion of coating layer 24 has an elastic modulus of from about 180 GPa to about 280 GPa, in other embodiments, from about 210 GPa to about 260 GPa, and in other embodiments, from about 235 GPa to about 255 GPa. In one or more embodiments, a modified metal oxide portion of coating layer 24 has an elastic modulus of about 230 GPa, in other embodiments, about 245 GPa, and in other embodiments, about 260 GPa.

In one or more embodiments, a modified metal oxide portion of coating layer 24 includes from about 0.5 wt. % to about 10 wt. %, in other embodiments, from about 2 wt. % to about 9 wt. %, in other embodiments, from about 3 wt. % to about 8 wt. %, in other embodiments, from about 2 wt. % to about 5 wt. %, and in other embodiments, from about 2 wt. % to about 3 wt. %, nitrogen, which is believed to be within metal nitride compounds. In one or more embodiments, a modified metal oxide portion of coating layer 24 includes about 1 wt. %, in other embodiments, about 2 wt. %, in other embodiments, about 3 wt. %, and in other embodiments, about 5 wt. %, nitrogen, which is believed to be within metal nitride compounds.

In one or more embodiments, a modified metal oxide portion of coating layer 24 includes from about 1 wt. % to about 56 wt. %, in other embodiments, from about 5 wt. % to about 40 wt. %, in other embodiments, from about 6 wt. % to about 25 wt. %, in other embodiments, from about 8 wt. % to about 15 wt. %, and in other embodiments, from about 11 wt. % to about 13 wt. %, metal nitride compounds. In one or more embodiments, a modified metal oxide portion of coating layer 24 includes about 4 wt. %, in other embodiments, about 8 wt. %, in other embodiments, about 12 wt. %, and in other embodiments, about 20 wt. %, metal nitride compounds.

The balance of a modified metal oxide portion of coating layer 24 that is not metal nitride is believed to be metal oxides.

As suggested above, nitriding step 22 reduces the grain size of coating layer 24 compared to oxidation layer 18. In one or more embodiments, a modified metal oxide portion of coating layer 24 has a mean average metal oxide grain size of from about 50 nm to about 150 nm, in other embodiments, from about 70 nm to about 100 nm and in other embodiments, from about 85 nm to about 95 nm. In one or more embodiments, a modified metal oxide portion of coating layer 24 has a mean average metal oxide grain size of about 80 nm, in other embodiments, about 95 nm, and in other embodiments, about 110 nm. In one or more embodiments, a modified metal oxide portion of coating layer 24 has a mean average metal oxide grain size of less than 100 nm, in other embodiments, less than 90 nm, and in other embodiments, less than 80 nm.

In one or more embodiments, a modified metal oxide portion of coating layer 24 has a mean average metal nitride grain size of from about 10 nm to about 75 nm, in other embodiments, from about 20 nm to about 60 nm and in other embodiments, from about 30 nm to about 50 nm. In one or more embodiments, a modified metal oxide portion of coating layer 24 has a mean average metal nitride grain size of about 30 nm, in other embodiments, about 40 nm, and in other embodiments, about 50 nm.

EXAMPLES

For Comparative Example 1, Comparative Example 2, and Example 1, a high frequency reciprocating rig (HFRR) with the following properties was used: dry, load of 2 N producing about 0.7 GPa of contact stress, temperature of 25° C., frequency of 50 Hz, and distances of 25 m, 50 m, and 100 m.

Comparative Example 1

Using the HFRR testing as above, a disc made from Ti-6Al-4V had a wear rate of between $1.0 \times 10^{-5}$ mm$^3$/J and $1.0 \times 10^{-4}$ mm$^3$/J.

Comparative Example 2

Using the HFRR testing as above, a disc made from Ti-6Al-4V and having only a nitride layer had a wear rate of between $1.0 \times 10^{-6}$ mm$^3$/J and $1.0 \times 10^{-5}$ mm$^3$/J.

Example 1

Using the HFRR testing as above, a disc made from Ti-6Al-4V and having a duplex treatment including an oxide layer subsequently modified by a nitriding step, in accordance with the present disclosure, had a wear rate of between $1.0 \times 10^{-7}$ mm$^3$/J and $1.0 \times 10^{-6}$ mm$^3$/J.

Comparative Example 3

A steel sample was tested for corrosion resistance in an ASTM B117 salt spray environment. The sample exhibited corrosion after 8 hours.

Example 2

A Ti-6Al-4V sample, having a duplex treatment including an oxide layer subsequently modified by a nitriding step, in accordance with the present disclosure, was tested for corrosion resistance in an ASTM B117 salt spray environment. The duplex treated Ti-6Al-4V sample achieved more than 1000 hours of exposure without showing signs of corrosion.

Example 3

Substrate discs of a 10-mm diameter with 5-mm thickness were fabricated from Ti-6Al-4V. The average surface roughness of the specimens prior to coating was Ra=0.02 μm. Imaging of the surface and composition determination of each substrate was accomplished using a Tescan Lyra equipped with energy dispersive spectroscopy (EDS). The composition of the substrates was titanium 90.8 wt. %, aluminum 5.97 wt. %, and vanadium 3.22 wt. %.

Thermal oxidation (TO) was performed on the Ti-6Al-4V samples in a Paragon high-temperature ceramic firing kiln equipped with a Sentry 2.0 micro processing controller. The kiln was equipped with a panel-mount style flowmeter for supply gas control.

The samples were cleaned ultrasonically in acetone for 15 minutes prior to being placed in the kiln. A feed of 0.7 m$^3$/hour of clean, dry air was flowed through the system during treatment to ensure adequate supply of oxygen during the process. The kiln was heated at a rate of 315° C./hour and held at 600° C. for 6 hours during the thermal oxidation treatment. After 6 hours, the samples were allowed to cool in the kiln environment to room temperature.

After treatment, there was a 4.6 μm oxide layer present at the surface, which was confirmed by optical microscopy of a sectioned sample. The surface roughness increased to about 0.20 μm after the thermal oxidation. The specimens had a matte appearance with a non-uniform brown color.

One of the oxidized specimens was placed into a loose wire mesh and submerged into a cyanate-based nitriding molten salt bath at 570° C. for 4 hours. After the duplex treatment, the specimen had a matte appearance with a black color.

Another one of the oxidized specimens was placed into a nitriding furnace, which was purged with nitrogen and then evacuated to a base pressure of at least $2\times10^{-5}$ Torr. The furnace was heated at a rate of 315° C./hour to a temperature of 600° C. The temperature was allowed to equalize for 30 minutes which was verified using an internal k-type thermocouple. Once the temperature had equalized, a nitrogen environment was established at a pressure of 760 Torr. The furnace was maintained at this temperature and pressure for 4 hours. Once the nitriding treatment was completed, the furnace was evacuated and the specimen was allowed to cool under vacuum to room temperature.

An SEM image showing the surface morphology after the duplex treatment was obtained. After the duplex diffusion treatment, the specimen had a matte appearance with a black color. The supplementary duplex treated sample had a diffusion zone about 25 μm deep. There was also about 7 μm of a compound layer present at the surface.

Figure 2A:
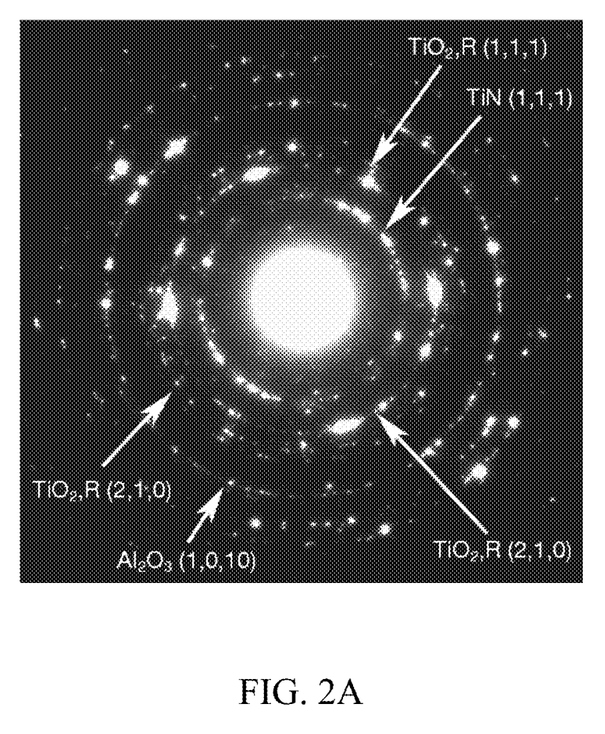
FIG. 2A is a diffraction pattern of a surface treatment according to one or more embodiments of the invention.
Figure 2B:
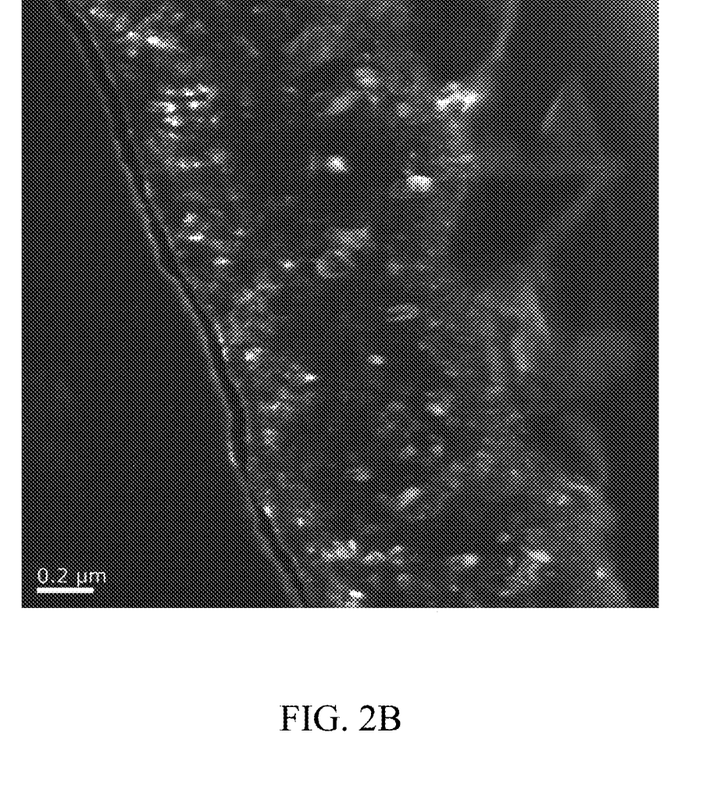
FIG. 2B is a dark-field transmission electron microscopy (DF TEM) image of a surface treatment according to one or more embodiments of the invention.
Figure 2C:
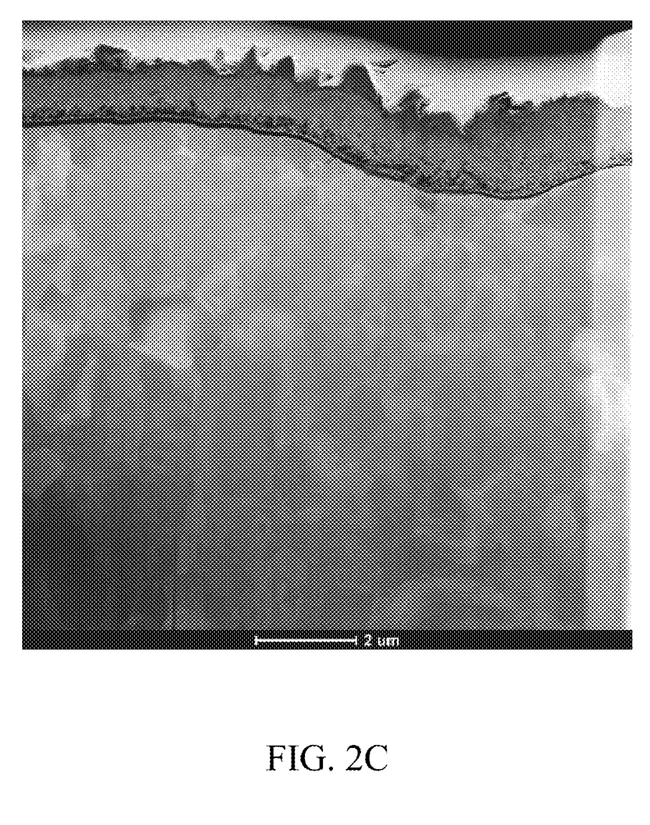
FIG. 2C is a scanning transmission electron microscope (STEM) image of a surface treatment according to one or more embodiments of the invention.

A platinum reference layer was utilized on the compound layer. Diffraction patterns obtained from the duplex treated (by gas nitriding) sample showed a polycrystalline ring pattern (shown in FIG. 2A). It was determined through indexing of the rings that there was a rutile TiO$_2$ layer on the surface with TiN crystals in the oxide layer. A dark field TEM (shown in FIG. 2B) was obtained and is believed to show that the TiN particles are relatively small and may be more densely packed in the area closer to the interface between the modified metal oxide portion and the sublayer of the Ti-6Al-4V substrate. STEM imaging (shown in FIG. 2C) showed fine grained TiO$_2$ with very fine grains of TiN incorporated. The darker areas are the TiN particles. The mean average grain size was determined to be 95 nm±11 nm for TiO$_2$ and 40 nm±9 nm for TiN. The sublayer transitioning between the coating layer and the remainder of the Ti-6Al-4V substrate was very fine grained and transitioned into the very coarsely grained Ti-6Al-4V substrate.

The duplex treated (by gas nitriding) sample was also analyzed using X-ray photoelectron spectroscopy (XPS) for analysis of the peaks.

The duplex treated (by gas nitriding) sample was also analyzed for wear testing. In both dry and lubricated sliding, the duplex treated sample experienced mild wear.

The coefficients of friction for dry and lubricated contact between the duplex treated sample and AISI 52100 steel were 0.66 and 0.13, respectively. The wear rates for dry and lubricated sliding were $6.72\times10^{-7}$ mm$^3$/J and $5.68\times10^{-7}$ mm$^3$/J, respectively.

The coefficients of friction for dry and lubricated contact between the duplex treated sample and tungsten carbide (WC) were 0.51 and 0.11, respectively. The wear rates for dry and lubricated sliding were $1.26\times10^{-6}$ mm$^3$/J and $2.85\times10^{-6}$ mm$^3$/J, respectively.

Tribocorrosion results for the duplex treated (by gas nitriding) sample were also analyzed. The duplex treated sample had an increase in tribocorrosion of three orders of magnitude compared to a comparative non-treated Ti-6Al-4V sample. This is believed to be due to the coating layer along with beneficial corrosion byproducts produced in Ringer's solution.

In light of the foregoing, it should be appreciated that the present invention significantly advances the art by providing an improved surface treatment for alloy substrates. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A surface treatment layer for a titanium-containing substrate comprising a disordered metal oxide lattice having metal nitride compounds doped in the disordered metal oxide lattice, wherein the surface treatment layer has a thickness of from about 1 μm to about 15 μm and a hardness of from about 1600 HV to about 2300 HV.

2. The surface treatment layer of claim 1, wherein the surface treatment layer includes from about 1 wt. % to about 40 wt. % of the metal nitride compounds.

3. The surface treatment layer of claim 1, wherein the surface treatment layer includes from about 6 wt. % to about 25 wt. % of the metal nitride compounds.

4. The surface treatment layer of claim 1, wherein the thickness of the surface treatment layer is from about 2 μm to about 10 μm and the hardness of the surface treatment layer is from about 1800 HV to about 2200 HV.

5. The surface treatment layer of claim 1, the disordered metal oxide lattice having a mean average grain size that is less than 100 nm.

6. A coated metal component comprising a titanium-containing substrate having a surface treatment layer therein, the surface treatment layer including a disordered metal oxide lattice having metal nitride compounds doped in the disordered metal oxide lattice, wherein the surface treatment layer has a thickness of from about 1 μm to about 15 μm and a hardness of from about 1600 HV to about 2300 HV.

7. The coated metal component of claim 6, wherein the titanium-containing substrate includes at least 40 wt. % titanium, prior to having the surface treatment layer therein.

8. The coated metal component of claim 6, wherein the titanium-containing substrate includes at least 70 wt. % titanium, prior to having the surface treatment layer therein.

9. The coated metal component of claim 6, wherein the surface treatment layer includes from about 1 wt. % to about 40 wt. % of the metal nitride compounds.

10. The coated metal component of claim 6, wherein the surface treatment layer includes from about 6 wt. % to about 25 wt. % of the metal nitride compounds.

11. The coated metal component of claim 6, wherein the thickness of the surface treatment layer is from about 2 μm to about 10 μm and the hardness of the surface treatment layer is from about 1800 HV to about 2200 HV.

12. The coated metal component of claim 6, the disordered metal oxide lattice having a mean average grain size that is less than 100 nm.

13. The coated metal component of claim 6, wherein the titanium-containing substrate is selected from the group consisting of a slide in a bolt carrier, a knee replacement part, a hip replacement part, a gear, a crankshaft, a knife, and shears.

\* \* \* \* \*